March 9, 1948.  E. C. PRICE  2,437,479
VEHICLE LOADING RAMP
Filed Nov. 29, 1945
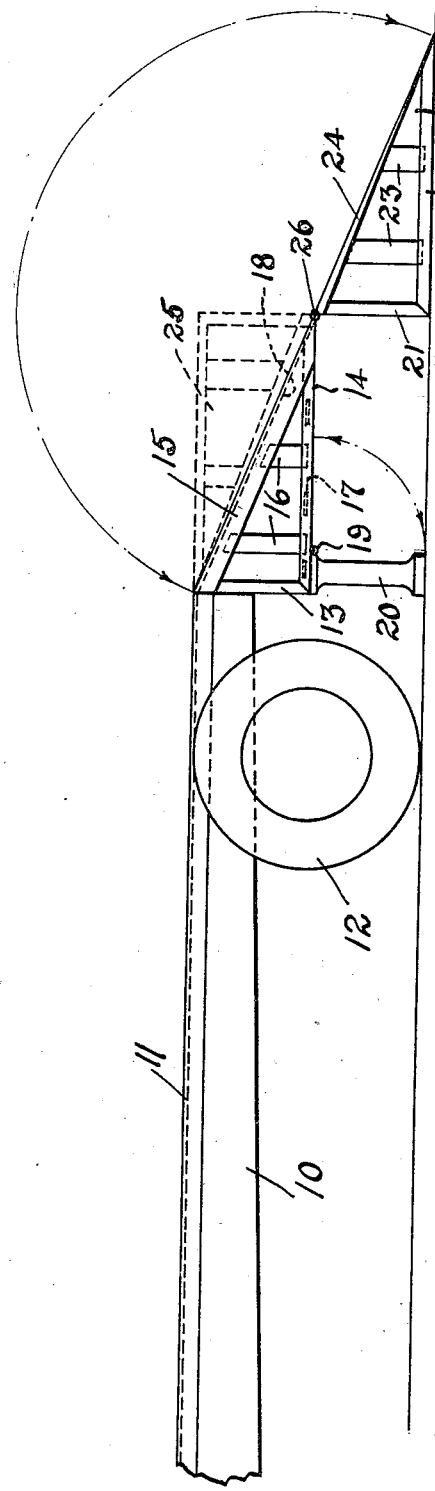
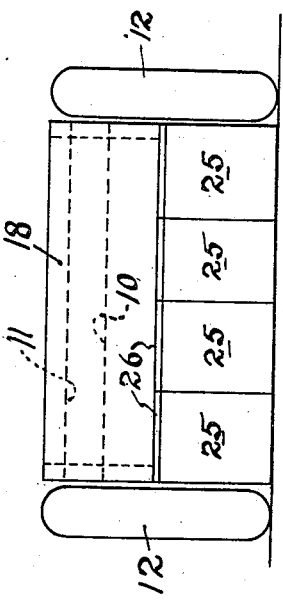
INVENTOR.
Edwin C. Price
BY Darby & Darby
Att'ys.

Patented Mar. 9, 1948

2,437,479

UNITED STATES PATENT OFFICE 2,437,479

VEHICLE LOADING RAMP

Edwin Carl Price, Newburgh, N. Y.

Application November 29, 1945, Serial No. 631,702

1 Claim. (Cl. 214—85)

This invention relates to improvements in loading ramps for vehicles and involves the combition thereof with a vehicle.

An object of this invention is to provide a portable loading and unloading ramp for a vehicle of such form and construction that it can be built on or permanently attached to the chassis or body of the vehicle and unfolded when in use.

Another object of this invention is to provide in simplified form a collapsible or foldable ramp for a vehicle which may either be used as an appurtenance thereto or permanently attached to the vehicle.

An important object of this invention is to provide a collapsible ramp for a vehicle of such construction that it can be folded when not in use and remain attached to the vehicle.

Other and more detailed objects of the invention will be apparent from the following description of the embodiment thereof illustrated in the attached drawings.

This invention resides substantially in the combination, construction, arrangement and relative location of parts, all as will be described in detail below.

In the accompanying drawings,

Figure 1 illustrates diagrammatically the rear end of a vehicle chassis showing the ramp of this invention attached thereto and opened out for use; and Figure 2 is a rear end elevational view of the vehicle with the ramp opened out for use.

As the detailed description of the ramp of this invention proceeds it will bcome apparent that the device is capable of use with various types of vehicles such as trucks, trailers, and the like.

An important object of the invention is to provide a loading and unloading ramp of such construction that it can be permanently attached to the vehicle whereby it is readily available when needed. The structure is further characterized in that its nature is such that the device can be easily folded and unfolded to condition it for use or non-use.

The rear end of the chassis of a vehicle is diagrammatically illustrated at 10 and is shown with a superposed platform 11 which in some cases may form the bottom of the truck body. The rear wheels of the vehicle are diagrammatically illustrated at 12. The ramp of this invention is attached to the vehicle chassis and/or body in any suitable manner as by welding, bolts, detachable clips, not shown, or in any available and well known manner. It may be well to note here that in some cases the ramp may be preferably detachable for loading into the vehicle or storage at loading points when not in use.

The ramp comprises two sections hingedly connected together at 26. These sections are generally of triangular form in side elevation and the section attached to the vehicle body comprises a series of suitable vertical and horizontal members 13 and 14 respectively united by inclined members 15. A series of vertical and horizontal braces 16 and 17 respectively are provided to form a sufficiently strong lattice like framework capable of withstanding the loads to which such a device is normally put. These structural members can be made of any suitable material, as for example steel bars and angle irons which can be secured together in any suitable manner, as for example by welding. Attached to the inclined members of the framework is a platform 18 forming a continuous smooth surface over which the articles may be moved during loading and unloading. The other section of the framework is similar to that previously described comprising the vertical and horizontal framing members 22 and the bracing members 23. The inclined member 24 of this frame comprises a platform which completes the triangular formation of the framework and provides the working surface for this section of the frame.

As illustrated in Figure 2, the lower section of the structure, that is the one which rests on the ground, is preferably sectionalized, that is divided into a number of sections, as for example four, as illustrated at 25 in Figure 2. The purpose of this is to facilitate closing of the structure by reducing the effort required in lifting the lower section. When sectionalized each section can be individually closed. It is clear, however, that this lower section could be made in one piece and closed as a unit.

As is clear from Figure 1, the two triangular frameworks are proportioned and shaped so that in closed position they form a box-like structure of rectangular form. Each triangular framework is of the same size and in closing may be a diagonal of the rectangular structure. The upper triangular framework in some cases may need additional support when loaded, and for that reason a brace 20 is provided hingedly mounted at 19 on this section so that it can be opened and closed as indicated by the arrowed broken line. When not in use it can be swung up against the lower side of the upper section and held in place by means of any suitable catch, not shown. In use it is swung down into contact with the ground to aid in supporting the upper section. In those cases where the upper section is strongly enough united with the chassis it may not be necessary to use the brace 20. In other cases the brace 20 may consist of a separate member and to compensate for uneven ground conditions it may be in the form of an ordinary jack or other type of expansible member so that it can be given the proper length to carry the loads from the upper section to the ground. The device is proportioned so that the lower or hinge section when opened will rest on the ground and the platform surface thereof forms an ample continuation of the platform surface 18 of the other section from the level of the vehicle body 11 to the ground. Those skilled in the art will readily appreciate that the particular type of hinge 26 which is employed is not important.

As is shown in Figure 2 of the drawings the ramp of this invention extends the full width of the chassis, but it is clear that it can be of a lesser width when desirable. In the diagrammatic illustration in the drawings the body of the vehicle is shown only as equal to the width of the chassis, whereas it is well known that frequently the body is considerably wider than the chassis and usually overhangs the wheels. In that event it will be apparent that when desired the ramp structure may extend for the full width of the body as distinguished from the width of the chassis.

From the above description it will be apparent to those skilled in the art that the subject matter of this invention is capable of embodiment in other physical forms, and therefore I do not desire to be limited to the embodiment presented herewith for illustrative purposes, but only as required by the appended claim.

What is claimed is:

A combination like that disclosed comprising a vehicle having a load carrying platform, a structural framework of triangular form in side elevation attached to the end of said platform, and a second structural framework of similar configuration hingedly connected to said first framework, the inclined surfaces of said frameworks forming a ramp from the platform level to the ground in open position and one side of said second framework in closed position forming an extension of said platform lying in the plane thereof.

EDWIN CARL PRICE.

REFERENCES CITED

The following references are of record in the file of this patent:

UNITED STATES PATENTS

| Number | Name | Date |
|---|---|---|
| 577,500 | Wilson | Feb. 23, 1897 |
| 963,918 | Miller | July 12, 1910 |
| 1,109,734 | Bauer | Sept. 8, 1914 |
| 1,754,533 | Van Kirk | Aug. 15, 1930 |
| 2,392,557 | Smith et al. | Jan. 8, 1946 |

FOREIGN PATENTS

| Number | Country | Date |
|---|---|---|
| 243,628 | Great Britain | Dec. 3, 1925 |